(12) United States Patent
Ploeger et al.

(10) Patent No.: US 7,076,850 B2
(45) Date of Patent: Jul. 18, 2006

(54) DUAL PISTON DISC BRAKE CALIPER COMPRESSOR

(75) Inventors: Randall J. Ploeger, Clarinda, IA (US); Louis J. Garcia, Gary, IN (US); George P. Juliano, deceased, late of Pittsburgh, PA (US); by Martha Juliano, legal representative, Pittsburgh, PA (US)

(73) Assignee: Lisle Corporation, Clarinda, IA (US)

( * ) Notice: Subject to any disclaimer, the term of this patent is extended or adjusted under 35 U.S.C. 154(b) by 175 days.

(21) Appl. No.: 10/858,322

(22) Filed: Jun. 1, 2004

(65) Prior Publication Data

US 2005/0000073 A1    Jan. 6, 2005

Related U.S. Application Data

(63) Continuation-in-part of application No. 10/798,659, filed on Mar. 11, 2004, now abandoned, and a continuation of application No. 10/339,091, filed on Jan. 9, 2003, now Pat. No. 6,874,217.

(60) Provisional application No. 60/533,898, filed on Jan. 2, 2004.

(51) Int. Cl.
*B23P 19/04*    (2006.01)
(52) U.S. Cl. ....................................................... 29/239
(58) Field of Classification Search .................. 29/239, 29/266; 269/6, 108
See application file for complete search history.

(56) References Cited

FOREIGN PATENT DOCUMENTS

GB       2 194 989 A      3/1988

OTHER PUBLICATIONS

*Lisle* catalog, No. 24400 Disc Brake Pad Spreader, p. 4.
*California Tool Co.* catalog, K-D Disc Brake Pad Spreader, No. 2145, Section 63, p. 760.
*California Tool Co.* catalog, OTC Disc Brake Pad Spreader, No. 7034, Section 63, p. 760.
*California Tool Co.* catalog, K-D Disc Brake Pad Spreader, No. 3376, Section 63, p. 760.
*California Tool Co.* catalog, ATD Tools, Disc Brake Pad Spreader, No. 5050, Section 63, p. 761.
*California Tool Co.* catalog, Cal-Van Disc Brake Pad Spreader, No. 702, Section 63, p. 761.
*California Tool Co.* catalog, Rimac, Disc Brake Pad Spreader, No. 0096, Section 63, p. 761.
*A & E Tools*, products brochure, Part No. 145, "*Ford Dual Piston Caliper Retractor*," p. 4, (Date Unknown, but prior to the present application).

(Continued)

*Primary Examiner*—Robert C. Watson
(74) *Attorney, Agent, or Firm*—Banner & Witcoff, Ltd.

(57)    ABSTRACT

A tool for spreading dual piston brake pads and for compressing the dual pistons of a dual piston disc brake assembly of the type including a disc brake caliper housing for the pads and pistons. The tool includes manually operated handles which drive a bracket assembly that engages the dual piston disc brake pads. The housing for the tool includes a plate which is engaged against the caliper housing. The plate and bracket assembly are driven in a manner which causes them to become spaced from one another. A mechanical advantage is achieved by utilization of handles with a lever arm extension associated with a pivotal handle.

5 Claims, 3 Drawing Sheets

OTHER PUBLICATIONS

*A & E Tools*, Part No. 135, "GM W-Car Front Piston Retractor," p. 24, (Date Unknown, but prior to the present application).

*Cal-Van Tools*, Specialty Tool Part No. 700, "Universal Disc Brake Pad Spreader," (Jun., 2000).

Blue-Point, Model BT350, "Dual Piston Brake Press Instructions," (May, 2002).

Invention Disclosure Agreement by Akira Iijima, "Brake Caliper Piston Spreader" dated Apr. 30, 1996.

Invention Disclosure Agreement by Louis J. Garcia, "Dual Piston Brake Caliper Compressor" dated May 9, 2000.

Invention Disclosure Agreement by Jeff Wedekind et al., "Disc Brake Spreader" dated Feb. 8, 2001.

Invention Disclosure Agreement by Hashmat Rahimi, "Dual Piston Brake Pad Spreader" dated Feb. 12, 2001.

Invention Disclosure Agreement by Robert Dunum, "Brake Single or Dual Piston Pushing Tool" dated Apr. 17, 2001.

Invention Disclosure Agreement by George P. Juliano, "Brake Piston Compressor Kit" dated Mar. 26, 1989.

Invention Disclosure Agreement by Marshall A. Green, "Disc Brake Pad Spreader" dated Jun. 29, 1995.

Invention Disclosure Agreement by Bernard H. Miller, "Disc Brake Pad Spreader" dated Mar. 18, 1996.

Invention Disclosure Agreement by Juan Lopez, "Disc Brake Pad Spreader" dated Jun. 18, 1997.

Invention Disclosure Agreement by Joe Barallon, "Tool For Seating Piston on Disc Brake Caliper" dated Jul. 9, 2000.

Invention Disclosure Agreement by Dal Sirany, "Brake Caliper Piston Retraction Tool" dated Dec. 5, 2000.

Invention Disclosure Agreement by George Gonzalez, "Disc Brake Pad Spreader" dated Aug. 16, 2001.

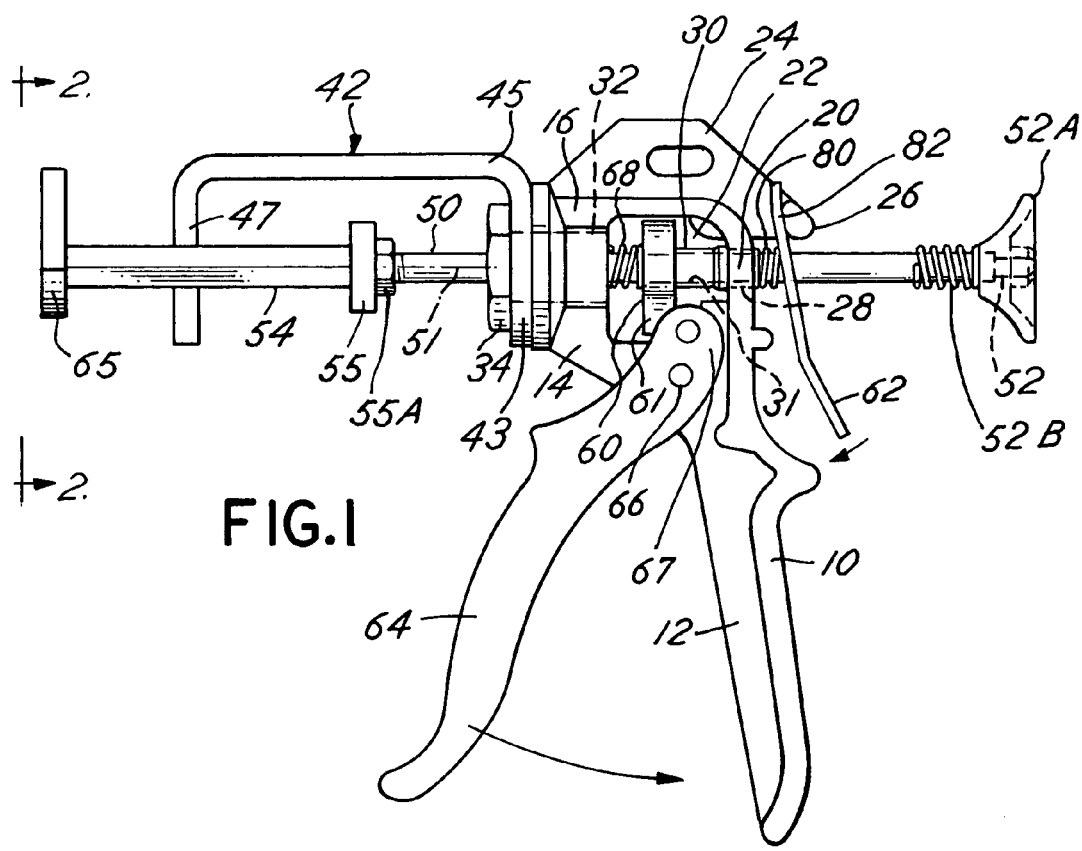

DUAL PISTON DISC BRAKE CALIPER COMPRESSOR

CROSS REFERENCE TO RELATED APPLICATIONS

This is a continuation in part application based on Ser. No. 10/798,659 filed Mar. 11, 2004 now abandoned entitled "Dual Piston Disc Brake Caliper Compressor" which is a utility application based upon and incorporating by reference provisional application Ser. No. 60/533,898 entitled "Dual Piston Disc Brake Caliper Compressor" filed Jan. 2, 2004 for which priority is claimed, and is a continuation of utility application Ser. No. 10/339,091 filed Jan. 9, 2003 now U.S. Pat. No. 6,874,217 entitled "Disc Brake Pad Spreading Tool" incorporated herewith by reference and for which priority is claimed.

BACKGROUND OF THE INVENTION

In a principal aspect the present invention relates to a tool for compressing the caliper pistons of a vehicle, dual piston disc brake assembly so that the disc pads may be removed and replaced. The invention thus comprises a manually actuated dual piston disc pad spreading tool.

In the repair of vehicles and, for example, with respect to the repair of vehicle braking systems, many special tools are desirable. Disc brakes thus may require special tools to facilitate repair. Disc brakes typically include a caliper housing which is mounted adjacent a wheel. The housing includes opposed disc pads which are piston driven toward one another for clamping a rotating disc associated with a rotating wheel of the vehicle to brake or stop the vehicle. From time to time, it is necessary to replace the pads due to the fact that they wear from frictional contact with the rotating disc. In such circumstances, the caliper housing is typically removed from the wheel assembly of the vehicle. The outboard pad is removed and the inboard disc pad mounted in the housing is caused to be spread apart by retracting the pad driving piston or pistons into the caliper housing. The pistons which have been pushed back allow adequate room for new pads to be replaced. The caliper housing may then be replaced in the wheel assembly and positioned for engagement with the brake disc.

Heretofore, applicant's assignee has made available in the marketplace a disc brake pad spreader tool, Lisle Product Model No. 24400. The Model No. 24400 disc brake pad spreader comprises a plate having a threaded rod through the center of the plate with a plunger mounted on the end of the rod. The plate is positioned against one side of a single-piston caliper brake pad frame, and the plunger is positioned against the inboard brake pad, so that by rotating the threaded bolt or rod, which connects the plate and plunger, the inboard pad is pushed back which forces the piston back into its cylinder.

More recently, applicant's assignee introduced an improved brake pad spreader tool, particularly designed for use with single piston disc brake constructions. The product, identified as Model No. 24300, is the subject matter of a separate patent application; U.S. patent application Ser. No. 10/339,091, filed Jan. 10, 2003, entitled Disc Brake Pad Spreading Tool, which is incorporated herewith by reference.

The described tools work quite well and have been widely accepted by auto mechanics responsible for the repair of disc brakes. A difficulty occurs with such tool designs; however, since the tools are not especially useful for repair of a dual piston disc brake assembly. This results because two separate, parallel drive, pistons mounted on the caliper housing are associated with such an assembly. That is, the pistons are mounted on a frame or housing wherein placement of a drive rod of the type in the above described tools is not possible because of the particular construction of the housing. The housing includes a center leg which interferes with positioning of the drive rod associated with the described tools.

Thus, there has developed a need for an improved disc brake pad spreading tool which can effectively retract the pistons mounted in the caliper housing for a dual piston disc brake and which can also compress simultaneously both of the pistons associated with the caliper housing.

SUMMARY OF THE INVENTION

Briefly, the present invention is a tool for retracting the pistons associated with a dual piston disc brake caliper. The tool includes a bracket assembly mounted on the end of a slidable rod which, in turn, is mounted in a hand actuated rod advancement mechanism. The rod advancement mechanism further includes a plate positioned in opposed relationship to the bracket assembly. The plate may be fitted against one side of a dual piston caliper brake pad frame, and the bracket assembly may then be driven into engagement with the inboard pad and pistons opposite the frame side thereby retracting the inboard pad and also simultaneously compressing the dual brake pistons into their cylinders.

The mechanism for advancing the rod upon which the plunger is mounted comprises a fixed handle and a pivotal handle. The pivotal handle engages a feed dog that drives the rod incrementally forward with each reciprocal movement of the pivotal handle. A rod brake or pawl comprised of a second pivotal plate is provided for engaging the drive rod and precluding backwards movement of the rod. In other words, as the rod is moved forward in incremental steps, the rod braking plate maintains the rod in a desired or fixed advanced position.

With the combination of the invention, an improved mechanical advantage is achieved for retracting the inboard pad of the dual piston disc brake and for driving the pistons associated with the disc brake caliper into the housing or frame. In this manner, new pads may be placed upon pad mounts in the caliper so as to permit the caliper to be reassembled with the disc brake assembly.

Thus, it is an object of the invention to provide a dual piston disc brake pad and piston compressing device which provides for improved mechanical advantage and ease of use.

It is a further object of the invention to provide a dual piston disc brake pad retracting device which is easy to use, economical, rugged, and easy to fit and position during repair of a disc brake assembly.

Yet another object of the invention is to provide a tool for retracting the inboard dual piston disc brake pad and for compressing the dual pistons of a disc brake assembly wherein the tool is comprised of a pair of handles, one of which is reciprocal with respect to the other to effect separation of a plate and bracket assembly wherein the plate assembly and the bracket assembly are respectively engaged with the outer caliper frame and the inboard brake pad.

Yet a further object of the invention is to provide an improved tool for retracting the inboard dual piston disc brake pad during repair of a disc brake assembly.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a side elevation of the tool of the invention;

FIG. 2 is an end view of the tool of FIG. 1 taken along the line 2—2 of FIG. 1;

FIG. 6 is a cross sectional view of the retention nut used in the tool of FIG. 1.

DESCRIPTION OF THE PREFERRED EMBODIMENT

Figure 3:
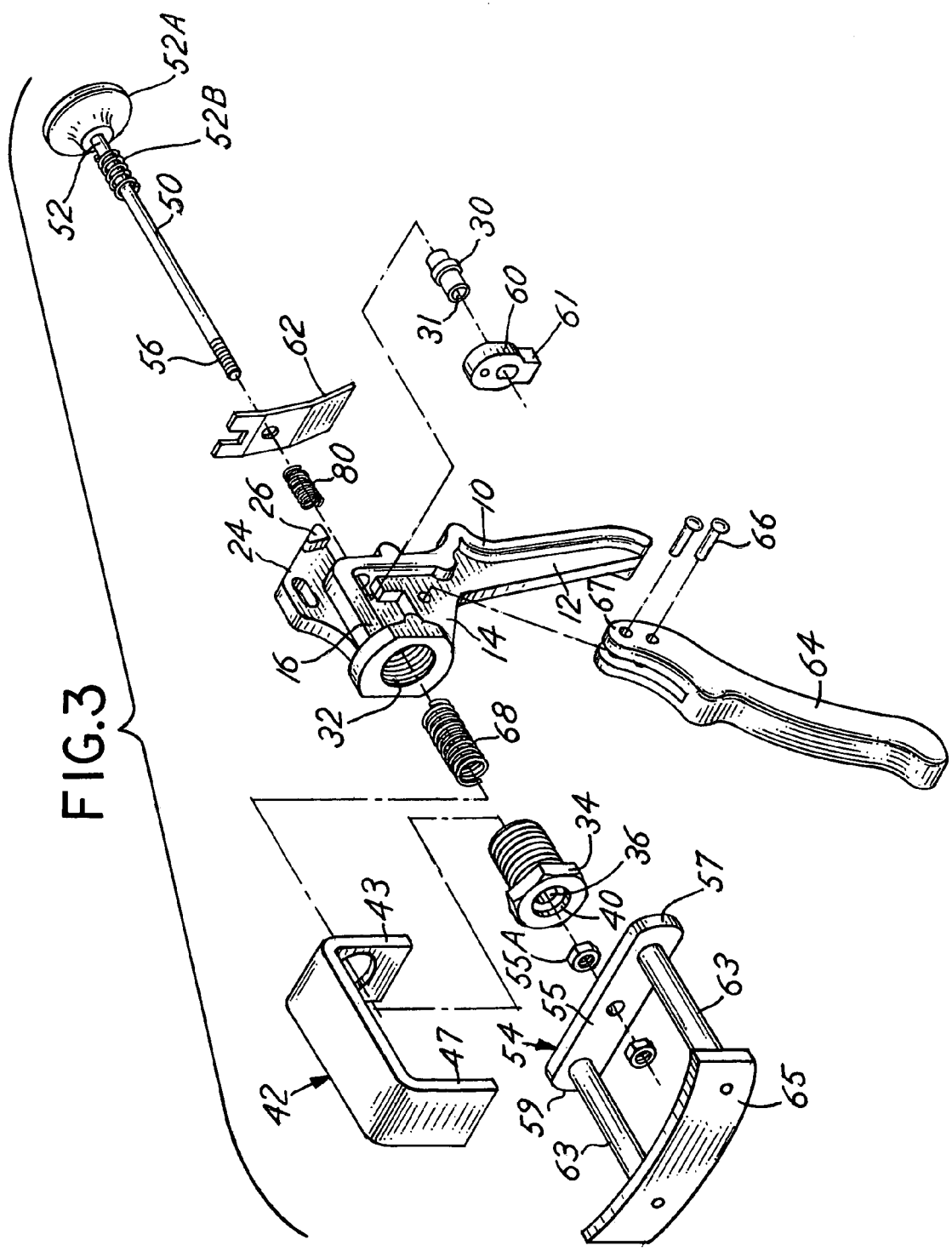
FIG. 3 is an exploded isometric view of the tool of FIG. 1.
Figure 4:
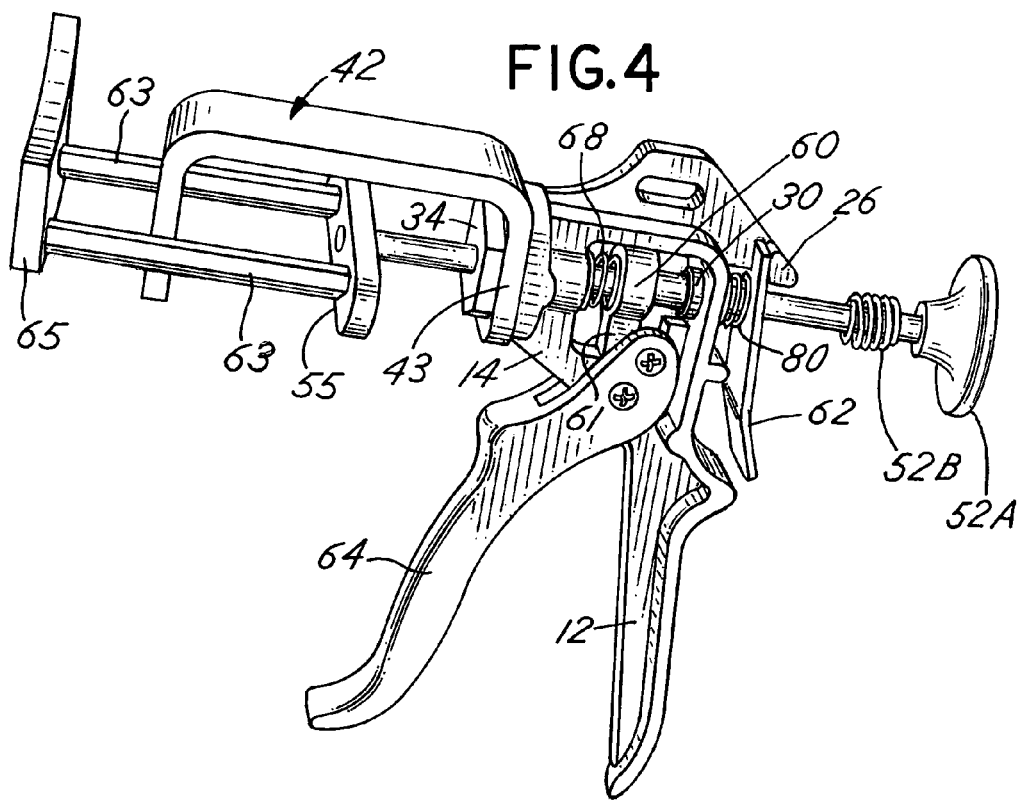
FIG. 4 is an isometric view illustrating the tool of FIG. 1.

Referring to the figures, the tool of the invention comprises a body or frame member 10. The frame member 10 includes a depending fixed handle 12 with an upper frame element 14 comprising a first or forward frame section 16 and a second or rear frame section 20. The frame sections 16 and 20 are generally parallel to one another and spaced to define a window 22. A reinforcing rib 24 with a mounting projection 26 is provided on the top of the frame element 14. The rear frame section 20 includes a throughbore 28 into which a cylindrical hollow fitting 30 with throughbore 31 is inserted. The front frame section 16 also includes a throughbore 32 into which a cylindrical flanged nut 34 having external threads, an internal axial throughbore 36 with axial counterbore 38 on the inside end and an axial counterbore 40 on the outside end being provided. The flanged nut 34 is threaded into the front frame section 16 and holds a U-shaped plate 42 onto the front frame section 16. The plate 42 is a U-shaped plate having a leg 43 retained by nut 34 on frame 16, an axial run 45 and a depending leg 47 parallel to and spaced forwardly from leg 43. Nut 34 is fully threaded as depicted to assure adequate strength and holding ability.

The flanged nut 34 and, more particularly the throughbore 36 as well as the throughbore 31 of the fitting 30 receive an elongate rod 50 defining a longitudinal axis 51. Elongate rod 50 comprises an end 52 with a knob 52A and a straight section fitting through or projecting respectively through the bores 31, 36 of the fitting 30 and nut 34. A bracket assembly 54 is attached to the outer end 56 of the rod 50. The rod 50 is thus slidable through the frame element 14 with the sliding movement controlled by means of a biased feed dog 60 and a biased locking bar, plate or pawl 62 in combination with a pivotal handle 64 mounted on the frame member 10 by means of a pivot pin 66.

The pivotal handle 64 includes a lever arm extension 67 which, when pivoted on pin 66, engages with a lower side or end 61 of the dog 60 and advances the dog 60 as well as the rod 50 against the biasing force of a coil spring 68 mounted on the rod 50 intermediate the dog 60 and a land 70 in the counterbore 38. Counterbore 38 functions to maintain the spring 68 appropriately guided in alignment for biasing of the dog 60.

The tool further includes a locking bar 62 biased by a spring member 80 about a pivot axis 82 on the reinforcing rib 24. The locking bar 62 includes a throughpassage into which the rod 50 fits, and when the biasing spring 80 biases the locking bar 62 in the manner depicted in FIG. 1 the edges of the throughpassage engage the rod 50, precluding the rod 50 from moving in the direction of the arrow or to the right as depicted in FIG. 1. The rod 50 may, however, be manually moved in the opposite direction or to the left as depicted in FIG. 1. The dog lever extension arm 67 of handle 64 provides a mechanical advantage when advancing the rod 50 to the left. In other words, the dog 60 includes a through-passage which is oversized relative to the diameter of the rod 50. Driving the dog 60 forward by means of actuation of the pivotal handle 64 causes the dog 60 to become canted slightly. It will thus engage the rod 50 and drive the rod 50 to the left as illustrated in FIG. 1. The dog 60 will return to its uncanted, initial position upon release of the handle 64 thereby enabling the spring 68 to transport dog 60 to the right and position the dog 60 for additional incremental movement of the rod 50. In this manner, the end 56 of the rod 50 can be driven so as to be further spaced from the leg 43 of the U-shaped plate 42.

Figure 5:
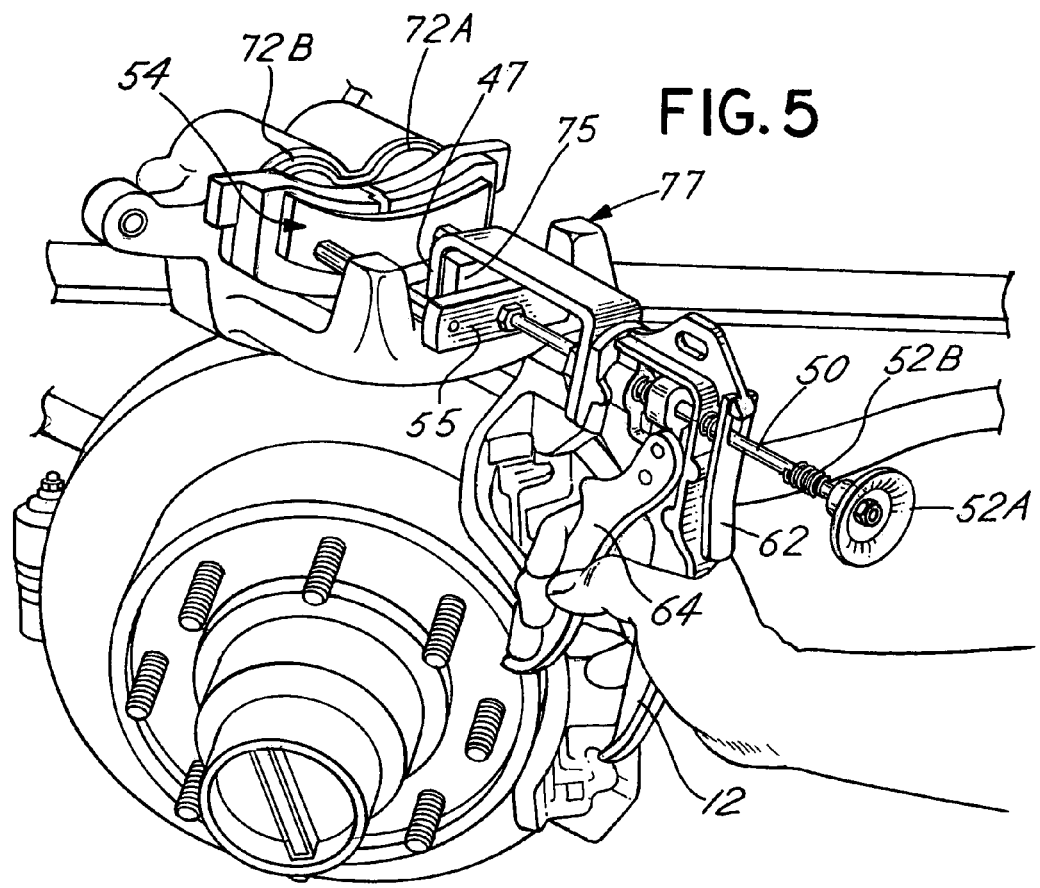
FIG. 5 is an isometric view illustrating the use of the tool of FIG. 1.

The bracket assembly 54 comprises a first plate 55 attached to the distal forward end 56 of the rod 50. The plate 55 includes opposite ends 57, 59 from which axially extending bracket frame members or pins 63 extend generally parallel to the axis 51. The opposite ends of the pins or extensions 63 are attached to a second arcuate, planar plate 65 which is generally parallel to and spaced from the first plate 55. Plate 65 is arcuate with the center of the arc extending toward the center of the disc as depicted in FIG. 5. This enables alignment of plate 65 with the associated dual pistons of the brake assembly. The bracket assembly 54 thus moves in response to movement of the rod 50. The leg 47 which extends from the run 45 of the plate 42 fits between the rods 63 and the plates 55, 65. Thus, the bracket assembly 54 may move in response to movement of the rod 50 while the plate 42 including leg 47 remains in a fixed position.

By positioning the leg 47 of plate 42 against one side of leg 75 of the caliper housing 77 of a disc brake assembly, such as depicted in FIG. 5, the plate 42 and frame defined by 10, 14, 16 and 20 is held from moving back which allows the handle 64 to drive the shaft 50 and bracket 54 toward the disk brake pad which retracts the pad and forces the pistons back into the frame 77. Once the inboard pad is retracted, (i.e. the pistons 72A, 72B compressed), the brake pads may be easily removed from the caliper housing since the tool may be removed. Thus, the spreading operation causes dual brake pistons 72A, 72B, which drive the pads toward each other, to be retracted into the cylinders where they stay since there is no fluid driving force imparted through the cylinders during repair. The inboard pad may thus be removed and new pads replaced which maintain the spread distance one from the other until the caliper is replaced within the brake assembly and attached to the brake line system. By retracting the pistons in the manner described, one can be assured that the caliper can be positioned so that the pads will fit over and on opposite sides of the disc of the disc brake assembly.

The described construction provides a mechanical benefit in that the handles 64 and 12, when used in combination with the other elements of the apparatus, enable the operator to provide a significant mechanical advantage due to the long extension of the typical handle 64 relative to the extension lever arm 67. The utilization of a locking dog 60 in combination with a locking plate 62 and associated biasing springs arranged in the manner depicted enables movement of the rod 50 to spread the pad spreading elements and maintain that spread. Release of the element from a spread position is effected by pressing on the brake lever or locking plate 62 and moving it clockwise in the direction shown by the arrow in FIG. 1 against the force of the biasing spring 80. The rod 50 is then free to move.

Importantly, as shown in FIG. 6, the flanged nut 34 includes counterbores 38 and 40 at the opposite ends thereof.

The counterbores are greater in diametrical dimension than the bore 36 for the rod 50. This enables the inside bore 38 to act as a guide for a dog biasing spring 68. The outside counterbore 40 enables the plunger to be positioned more closely to the plate 42 inasmuch as a mounting nut 55A for the bracket assembly 54 may fit within the recess defined by the counterbore 40. Thus, the pad engaging elements associated with the described tool will have a more universal application inasmuch as they can be used with calipers having a wide variety of caliper sizes.

Variations of the construction may be adopted. For example, the particular arrangement of the handle may be reversed with the back handle 12, which is a fixed handle, being made to be pivotal and the forward handle 64 being made to be fixed. The particular arrangement of the locking bar 62 may also be altered. The construction of bracket assembly 54 may be varied as may that of plate 42. Thus, while there has been set forth a preferred embodiment of the invention, it is to be understood that the invention is limited only by the following claims and equivalents thereof.

What is claimed is:

1. A tool for spreading brake pads and compressing first and second pistons of a dual piston disc brake assembly, said brake assembly including a disc brake caliper housing, said pistons mounted in generally parallel, spaced, side by side cylinders in the caliper housing, said pads mounted on opposed pad mounts attached respectively to the pistons and to the caliper housing for engagement with a brake disc member therebetween, said caliper housing including a frame leg in opposed relation to the cylinders and spaced therefrom, said tool comprising, in combination:

a manual drive mechanism mounted in a frame and including a projecting drive rod having an outer end, said drive mechanism further including a manually actuable handle attached to the frame for incrementally advancing the rod in a first axial direction from the frame, and a latch mechanism for retaining the rod in an advanced position in the frame, said latch mechanism being releasable to enable reverse axial movement of the rod in a direction opposite advancement thereof;

a retention plate attached to the frame and extending axially from the frame in general alignment with the drive rod, said retention plate including a leg for hooking over a caliper housing frame leg to prevent the tool frame from being pushed back from the caliper housing when the drive rod is extended; and a bracket assembly attached to the outer end of the drive rod, said bracket assembly including a first cross member, axial extension members supported by said first cross member, said axial extension members extending axially from the first cross member, and a piston engaging member attached to the extended axial extension members whereby upon extension of the drive rod, the bracket assembly including the piston engaging member are extended to force the pistons back into their respective cylinders.

2. The tool of claim 1 wherein the retention plate is attached to the tool frame by a nut threaded into the tool frame, said nut including a bore for passage of the drive rod.

3. The tool of claim 2 wherein the nut includes a counterbore for receipt of a mounting nut for said bracket assembly.

4. The tool of claim 1 wherein the piston engaging member of the bracket assembly is an arcuate, planar plate.

5. The tool of claim 1 wherein the axial extension members comprise first and second generally parallel pins extending on opposite sides of the retention plate and connecting the first cross frame member to the piston engaging member.

* * * * *